March 23, 1943.  G. HERBSTER  2,314,825
HEATING APPARATUS
Filed Aug. 3, 1940   4 Sheets-Sheet 1

Fig.1

INVENTOR.
GEORGE HERBSTER
BY
HIS  ATTORNEY

Fig.2  Fig.4  Fig.5

INVENTOR.
GEORGE HERBSTER
BY John H. Leonard
HIS ATTORNEY

March 23, 1943. G. HERBSTER 2,314,825
HEATING APPARATUS
Filed Aug. 3, 1940 4 Sheets-Sheet 3

INVENTOR.
GEORGE HERBSTER
BY
HIS ATTORNEY

Patented Mar. 23, 1943

2,314,825

UNITED STATES PATENT OFFICE 2,314,825

HEATING APPARATUS

George Herbster, Cleveland, Ohio

Application August 3, 1940, Serial No. 350,585

25 Claims. (Cl. 126—110)

This invention relates to a heat exchange apparatus and specifically to a heat exchange head construction adapted for efficient cooperation with simple and inexpensive heating means and air forcing means for heating spaces such as buildings or rooms of buildings.

An object is to provide a heat exchange head of such construction that products of combustion, as from a gas burner, can be conducted and distributed in highly effective heat exchanging relationship to air passed through the head, and to provide an improved arrangement for conducting air forced through the head without objectionable eddy currents being set up and without the creation of forces tending to cause the air forcing means to operate at a disadvantage and which will not require a disproportionate amount of power input.

Further objects include the provision of a heat exchange head which can be formed of cast metal substantially in one piece, an improved head with means to cause the products of combustion to be conducted from their source uniformly to all surfaces presented for heat exchange, to provide a head which is especially designed to prevent back pressure and eddying losses of air flow especially when used with a propeller type fan, and to provide an improved grill arrangement for distributing heated air into a space to be heated.

Another object is to provide a heat exchange head which comprises generally a plurality of concentric tubes so configured and spaced apart radially as to provide between adjacent tubes circumferentially elongated and unobstructed passages which are of Venturi shape in a direction from rear to the front of the heat exchanger so that air can be passed therethrough in large volumes efficiently, noiselessly, and in intimate and efficient heat exchanging relation to the tubes.

Other objects include the provision of a heating head adapted to receive products of combustion from a gas burner and wherein elongated radiating tubes of different lengths for receiving products of combustion are so arranged with respect to the source of said products that the tubes will be supplied therewith, by convection currents, in proper proportion to their length, radiating surface, and the air circulated therepast; a combined heating head and combustion manifold using tubular heat exchange elements spaced apart radially from a common center for permitting passage of air therebetween and wherein combustion can take place adjacent the tube entrances, but without impingement of the flame thereon while the products of combustion are properly distributed to the tubular elements; an arrangement in general accordance with the above employing generally concentric peripherally adjacent tubes for conveying products of combustion, in which the tubes have entrance openings which are enlarged gradually toward the combustion space and so directed relative to the normal direction of travel of heating media in and from the primary combustion space that the products of combustion will be supplied to the tubes in volumes increased in proportion to the distance of the tubes from the center; in which silence of operation from the standpoint of passage of air through the head is secured, and in which the tubes, progressively outwardly from the center, have progressively greater conducting capacity for heating media.

Another object is to provide a heater having a combined combustion chamber and set of peripherally adjacent concentric tubes for conveying heating media to heat exchange areas, wherein pressures in the different portions of the chamber are properly proportioned relative to the lengths of tubes communicating with said portions.

Other objects and features will become apparent from the following description relating to the accompanying drawings which show the preferred forms. The essentials of the characteristics are summarized in the claims.

Heretofore such units have been provided which include a cabinet containing a heat exchange head located above a gas burner with passages leading upwardly from the burner for the passage of the heated products of combustion. Propeller type fans are arranged in the rear of such heads for causing a circulation of air through the heads for purposes of heating. The heating heads of such prior structures usually comprise a series of upright tubes for the heating media with space between the tubes for the passage of air, or horizontal tubes for the passage of air with space therebetween for the heating media. In all such structures, however, it is difficult to provide a smooth and quick flow of air through the heat exchanger, especially with a propeller type fan, as considerable noise and loss of flow are occasioned by impingement of the whirling air stream from the fan against the walls of the tubes and other obstructions. This, in turn, results in back pressure which reduces the effectiveness of the fan. The present arrangement eliminates the rows of tubes and provides a series of concentric heating elements and elongated concentric air passages between the heating elements and which are unobstructed circumferentially of the common center of the tubes and so shaped and arranged with respect to the fan that there is no tendency for the air to impinge on the surface of the concentric heating elements in a manner which creates noise and resistance to the passage of air therethrough in the general direction desired. The present heat exchanging head can be used effectively with a pressure type air blower or forcing means with considerable advantage but such blowers are more expensive and require more operating space than the propeller type of fan.

Referring to the drawings.

Figure 1:
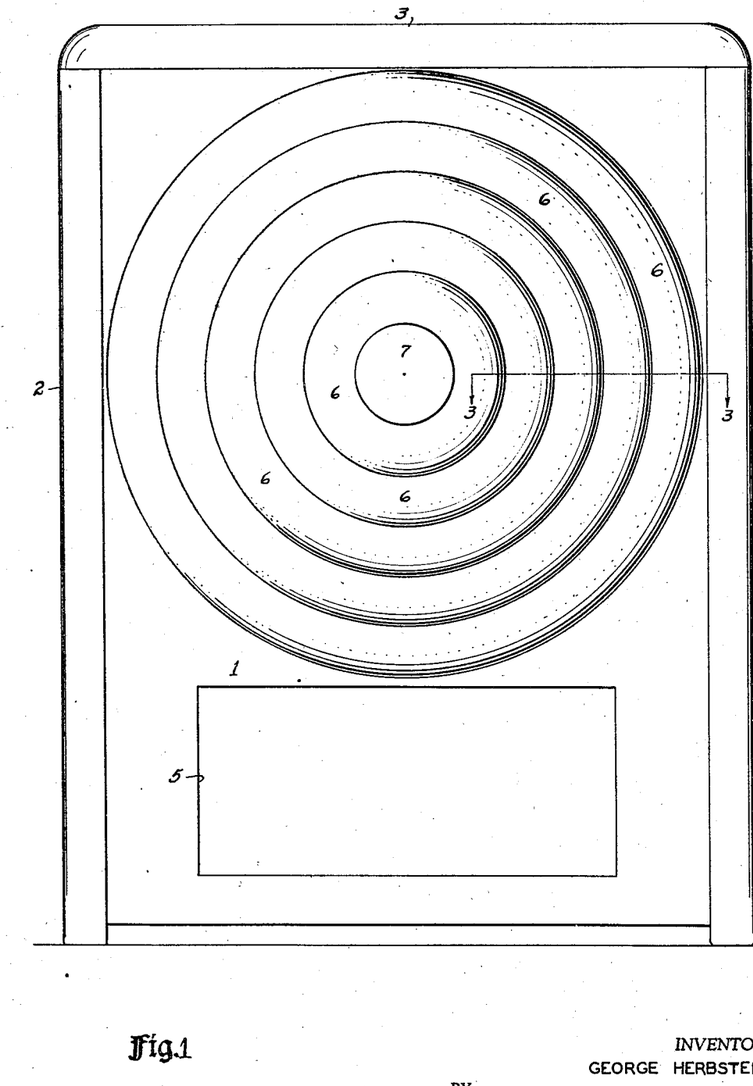
Fig. 1 is a front elevation of a cabinet containing the preferred heat exchange head and warm air distributing grill arrangement hereof.

Referring to Fig. 1, the cabinet comprises a front wall 1, side walls 2, and a top wall 3. These walls may be sheet metal and secured together as by bolts or fasteners. The front wall may have a fire door 5 near its base portion. The outlet grill for heated air is shown as comprising a plurality of concentric vanes 6 diverging outwardly from the center and a central member 7 which cooperates with the vanes to spread air received from the interior of the cabinet in generally divergent directions relative to the axis of the central member 7.

Figure 2:
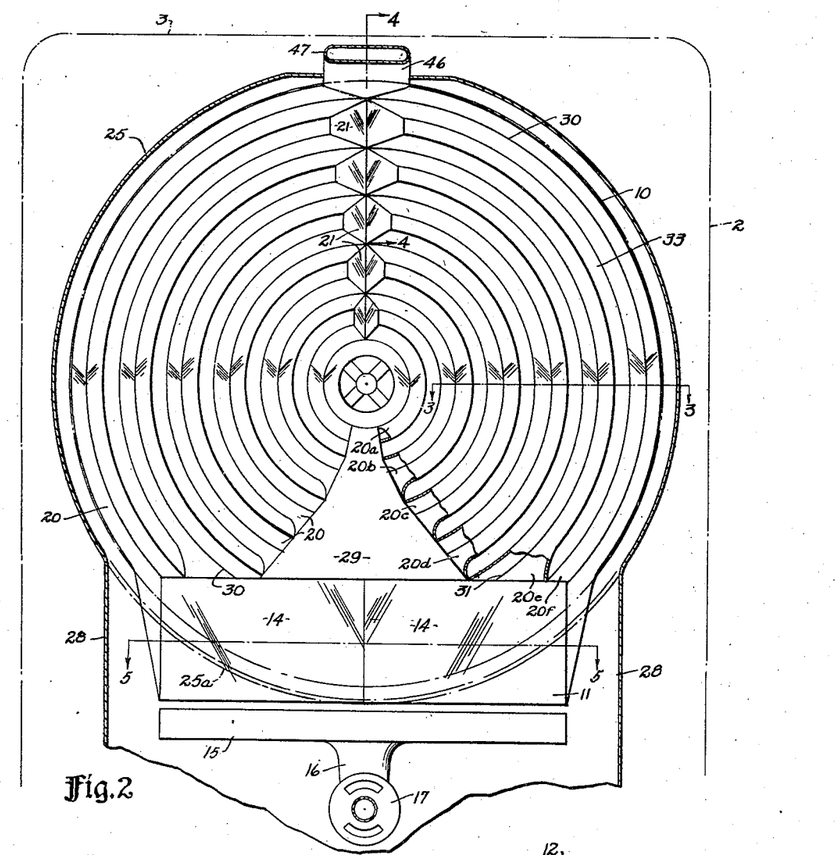
Fig. 2 is a transverse sectional view taken on a plane parallel to Fig. 1, and showing the heat exchange head in rear elevation, together with an exemplary form of burner.
Figure 3:
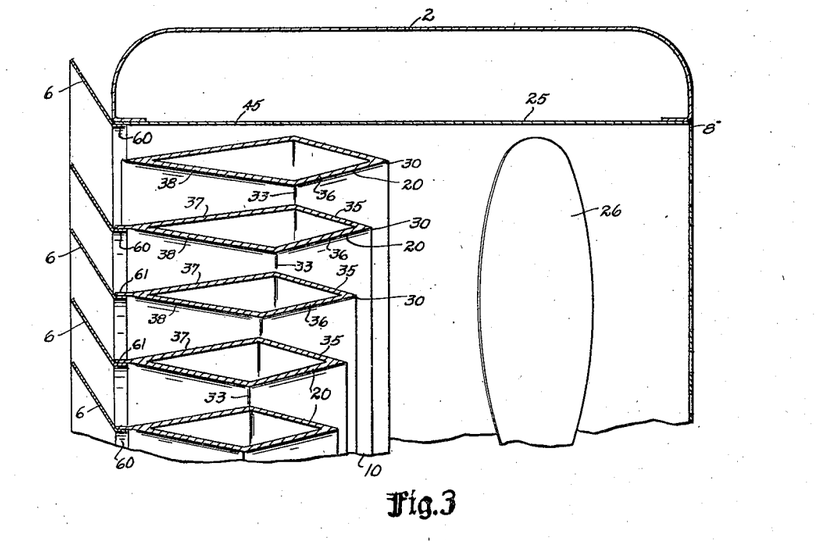
Fig. 3 is a fragmentary sectional view of the head, grill and cabinet portions substantially as indicated by the line 3—3 on Figs. 1 and 2.

Referring to Figs. 2 to 5, the top and side walls 2 and 3 can be connected to a rear wall 8 as illustrated at the right in Fig. 3, so as to complete the cabinet. The rear wall can be open to admit air into the cabinet behind the heat exchange head.

Figures 4, 5:
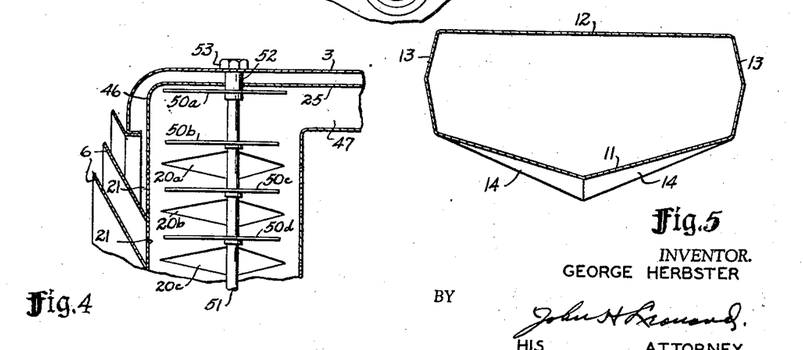
Fig. 4 is a detail sectional view substantially as indicated by the line 4—4 on Fig. 2 and showing a damper means and flue connection for the head, a modified construction of the latter also being shown.
Fig. 5 is a fragmentary sectional plan view, in reduced scale, of a lower or base portion of the head as indicated by the line 5—5 on Fig. 2.

The heat exchange head 10 is suitably supported inside the cabinet at the rear of the grill 6—7. The head has a hollow base portion 11 which is of generally rectangular form, as shown in Fig. 5, and comprising a front wall 12, side walls 13, and a rear wall 14. The space defined by the walls 12 to 14 just mentioned, is open at the bottom adjacent a heating element such as a gas burner 15, also supported in the cabinet by suitable means, not shown, and provided with a supply tube 16 leading from a mixing device 17 shown more or less diagrammatically.

The portion 11 provides a combustion chamber and inlet manifold such that fuel from the burner 15 and secondary air are admitted at the open bottom of the chamber and around the burner and pass by convection upwardly during combustion which is sustained in the combustion chamber. The products of combustion pass upwardly from the combustion chamber into the heat exchange portion of the head, now to be described, the distance between the combustion chamber and the entrance to the heat exchange portion of the head being such as to reduce the possibility of impingement of the flame on the heat exchange portion.

The heat exchange portion comprises a plurality of concentric tubes 20 which are open at their lower ends for receiving products of combustion from the combustion chamber. The tubes are peripherally adjacent but spread apart radially so as to define between adjacent tubes a plurality of passages for air, the shape of which is later described herein. The entrances to the tubes 20, are indicated at 20a to 20f, inclusively, and each entrance is flared so that the effective entrance of each tube merges with the entrance of the adjacent tube. The entrance of each tube faces more directly into the path of the products from the combustion chamber than the next adjacent tube inwardly toward the center therefrom. Each of the tubes 20 is of generally diamond-shape cross section, as best illustrated in Fig. 3.

The tubes 20 preferably terminate at their forward limits in substantially the same plane and extend rearwardly therefrom different distances, depending upon the distance of the particular tube from the common center. Each tube extends farther rearwardly than the tube which is inwardly next adjacent to it. Thus, the cross-sectional area of the passages through the respective tubes may be made progressively larger from the inner tube to the outer tube without changing the space between the tubes or the radial width of the tubes.

As a result of the position of the entrance to the tubes relative to the oncoming products of combustion and the relative sizes of the tubes and their position relative to the combustion chamber, more products of combustion pass into and through the tubes progressively from the center tube to the outer tube. Since, however, each tube is longer than the next adjacent tube inwardly of the head, greater radiating surface is provided in the former and the above relation of the volume of products of combustion to the tubes proportions the products more efficiently with respect to the radiating surface of the heat exchanger. Furthermore, in case a propeller-type fan is used and arranged concentrically of the head, more air is passed over the outer tubes than the inner tubes because the former lie in the zone of highest efficiency of the fan. The increased volume of products of combustion flowing through the outwardly disposed tubes provides for efficient heating of this greater volume of air. Thus, by assuring the passage of the greater portion of the products to the outwardly lying tubes, the heating of the air passing all points of the tubes is more uniform, regardless of the volume of air passing any given point in a given time. All of the tubes communicate at their opposite ends with a common exhaust header conduit 21 which intercepts all of the tubes and is adapted for connection to a flue or stack as will later be described.

Surrounding the head 10 is a cowl member 25 which is of generally circular form at its upper portion and extends from front to rear of the cabinet, joining the front and rear walls 1 and 8, in the manner such as shown in Fig. 3. The upper portion of the cowl forms a working chamber for an air forcing means illustrated as a propeller-type fan 26, only one blade of which is shown. The fan is coaxial with the concentric tubes or conduits 20. The lower side portions 28 of the cowl member may extend downwardly generally parallel to the side walls of the cabinet which lis indicated in broken lines in Fig. 2, but in fairly close relationship to the base member or combustion chamber 11 of the heat exchange head. The blades of the fan 26 extend sufficiently close to the circular portion of the cowl 25 so as to minimize air losses around the fan. All portions of the cowl in the region of the fan are circular, as indicated partly by the broken lines 25a on Fig. 2.

Part of the tube entrances 20a to 20f communicate with an upward generally triangular extension or manifold portion 29 of the combustion chamber 11, which portion lies over the burner 15, and part of the entrances communicate with portions of the combustion chamber which are laterally adjacent and somewhat below the manifold portion 29. This accomplishes the desired distribution of heating media to the different conduits or tubes 20 and at the same time provides ease in casting. Moreover, the arrangement provides for continuing the conduits or tubes in a circular direction and concentric with the fan axis about as far as practicable in the region of the base of the head while maintaining uniform distribution to the entrances 20a to 20f. The outer tubes or conduits 20 receive greater volumes of heating media than will those toward the center, partly because of the difference in angle of presentation of their inlets to the rising currents of heated gas and partly because of the size and shape of the inlets. The volumes received by the tubes should, of course, be proportional to the length and cross section of the tubes and the volume of air to which they will be subjected. The heat exchange portions of the head are not subject to impingement thereon of flame due to the height and location of the tube entrances above the burner 15 and combustion chamber and to the flow of secondary air which is admitted generally at the periphery of the chamber as well as around the burner.

In order to deflect the air delivered by the lower portion of the fan away from the burner and generally upwardly toward the central region of the circular tubes, the rear wall 14 of the base (toward the fan) may be of pyramidal form as indicated on Fig. 5. The lower portion of the wall 14 slopes rather steeply toward the side walls 13, and this steepness is gradually reduced toward the top of the base substantially to zero. The rear wall of the extension 29 is offset forwardly from the rear wall 14 and can be disposed substantially flush with the rearmost surfaces of the tubes 20.

As mentioned, the tubes are of different lengths forwardly and rearwardly of the head, as shown on Fig. 3, so that, proceeding outwardly from the center, the rear edges of the tubes gradually approach closer to the working plane of the fan and thus tend to confine the air and reduce radial flow.

All the tubes 20 are of approximately the same form in cross section, being elongated diamond-shape, all of about the same width radially of the head and with relatively narrow edges 30 presented directly toward the working plane of the fan. The radially widened portions of adjacent diamond-shaped tubes are so related to each other as to provide, in effect, Venturi restrictions as at 33, and these may be in relatively offset planes normal to the fan axis so that the diverging tube walls 37 and 38, defining the discharge portions of the passages between the tubes, are longer than the converging, or entrance, portions of the air passages and are of progressively greater length forwardly and rearwardly of the head outwardly from the center of the head. However, the diamond shapes are sufficiently distorted so that the adjacent high points on adjacent tubes are directly opposite each other for true Venturi effect on air passed through the heat exchange head.

It will be apparent from Fig. 3 that circular portions of the air of the generally swirling body or column delivered by the fan will be caught betwen the tubes 20 and compressed by adjacent walls 35 and 36 of the tubes which define the passages for air, so that said portions of air are brought into intimate heat-exchange relationship to the walls of the conduits. After passing the restrictions, the separated circular portions of the air column are allowed to expand and are conducted by the relatively diverging surfaces 37 and 38 of adjacent tubes 20 to the points of discharge from the head. The arrangement described decreases resistance to flow in a general direction parallel to the fan axis and also causes more effective transfer of heat from the walls of the tubes 20 to the air passed between the tubes than rows of individual Venturi tubes previously employed for a similar purpose, and eliminates air noises.

The provision of elongated circumferentially extending and unobstructed passages of Venturi-shaped cross section between the tubes greatly prolongs the period of contact between given small volumes of air and the tube walls, as well as reducing eddying, back pressure, and noise, and increases the intimacy of contact of the air and walls. The effects produced by the circular or circumferentially extending passages for air are somewhat analogous to those produced by Venturi tubes which are considerably longer than the actual length of the passages forwardly and rearwardly of the head.

Figure 6:
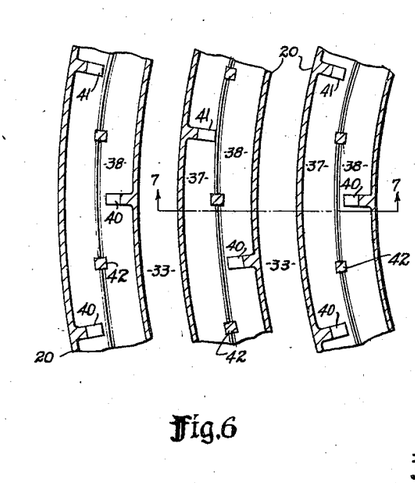
Fig. 6 is a central, fragmentary sectional view of concentric portions of the head illustrating particularly the manner in which hot gases can be made to pass slowly through the head in certain portions of the conduit spaces for such gases.
Figure 7:
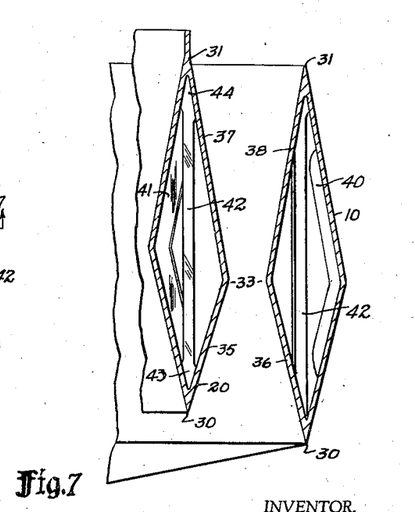
Fig. 7 is a fragmentary sectional veiw taken at right angles to Fig. 6 as indicated by the line 7—7 on Fig. 6, and Figs. 8 and 9 are rear elevations of respective modified forms of heat exchange heads, the views being similar to Fig. 2.

In order to delay the passage of the heating media through the tubes 20, a system of baffling such as shown by Figs. 6 and 7 may be used inside part or all of the tubes, particularly the shorter tubes. In Figs. 6 and 7, 40 and 41 indicate fins which extend along the relatively converging and diverging innner walls of the tubes as best illustrated by Fig. 7. The fins may be placed in staggered relationship, on opposite sides of each tube passage, and if additional baffling is required in certain zones or certain of the tubes to increase the rate of heat absorption in such zones, cross members 42 may be positioned between the radial planes of respective sets of fins 40 and 41 and connected at their ends as at 43 and 44 to the forward and rearward converging wall portions of the tubes.

Referring further to Fig. 3, the annular portion 45 of the cowl 25 which is adjacent the outermost tube 20 lies in such proximity thereto as to afford a constricting and then expanding passage for air past the heat exchange head in co-operation with the outwardly disposed relatively inclined wall surfaces of the outermost tube, wherefore said outwardly exposed surfaces are rendered as fully effective for heat exchange as are the surfaces on the other tubes. This effect can be had without requiring special forming operations on the material of the cowling, as will be apparent.

As discussed above with reference to Fig. 2, the products of combustion enter the tube entrances 20a, 20b, etc., in volumes proportional to the lengths and sizes of the tubes, greater volumes being received by the more outlying conduits. The junction head sections or portions 21 increase in size in a radial direction so as properly to carry away the outwardly progressively increasing volume of combustion products from the tubes. Aligned with the outermost junction header portion 21, as shown in Figs. 2 and 4, is a vent outlet 46 to which is connected a suitable flue member 47 as by a suitable joint, not shown. The cowl 25 can be suitably apertured to receive either the vent extension 46 or the member 47. The passages through the various tubes can be variably restricted at the junction headers 21 by individual dampers 50a, 50b, 50c, etc., carried on a common shaft 51 adapted to be raised and lowered from a point outside the cabinet. The lower end of the shaft 51 may have a suitable guide anywhere in the heating head casting, and the upper end is threaded for engagement with an internally threaded sleeve 52 having a control nut 53 bearing on a suitable support such as the top wall of the cabinet. Assuming the shaft 51 is prevented from turning as by appropriate keying at its lower end, rotation of the nut 53 in one direction will lower the dampers 50a, 50b, etc., and reverse rotation will raise them.

The grill as shown comprises a system of circular vanes, previously designated 6, and a central piece 7 which may comprise a hollow cone closed on all sides, the base of which is shown as the innermost circle in Fig. 1. The free portions of the vanes diverge outwardly and at approximately the same angle, as best shown in Fig. 3, which is approximately 60° to the central axis of the head or fan. Each vane can comprise a nearly closed annulus of sheet metal rolled to the proper shape, and each has a short attaching flange, as at 60, to peripherally abut a flange 61 on the forwardly facing thin edge portion of a respective tube 20 and interlock therewith. The attaching flanges 60 can lie against the inner peripheral surfaces of the flanges 61 of the conduits or outwardly therefrom as desired. In either case, the flanges 61 are so shaped as to hold the vanes in place when the opposite ends of the vanes are secured in place as may be done in a variety of ways not shown. In the specific illustration of Fig. 3, the vanes and their short flanges 60 may be expanded when the ends are secured, causing the flanges tightly to hug the inner sides of forwardly converging flanges 61 of the tubes 20. The flange 60 of the outermost vane member 6 can be fastened to the inside of the cowling member 25, or expanded into contact therewith when the ends of the outermost vane member are secured in place.

The vanes operate to distribute the air which has been heated by the tubes 20 in all directions from the grill center and for a considerable distance forwardly of the unit. Since the air is still swirling as it leaves the spaces between the conduits 20, and thus tends to expand relative to the grill center, the air is delivered without appreciable eddying, back pressure, or lag, as a plurality of coaxial frusto-conical annuli which expand away from the heater and issue at such an angle to the fan axis that they will not strike a person standing a very short distance in front of the grill. Likewise, due to the angle of the vanes and the blocking effect of the center element 7 of the grill, the air in a room in which the heater is operating tends to return to the center of the grill and is caught and mixed with and tempers the heated air from the heater.

Figure 8:
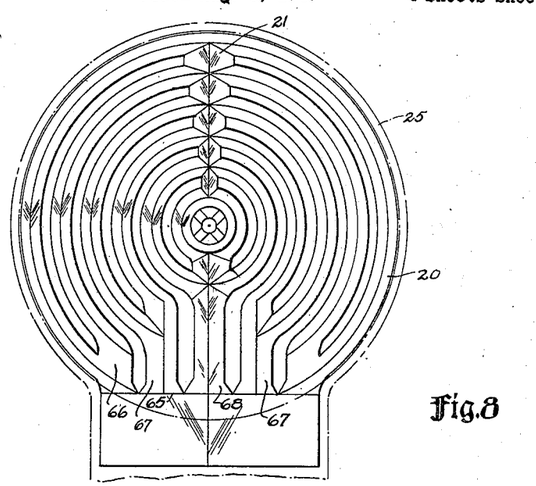
Figure 9:
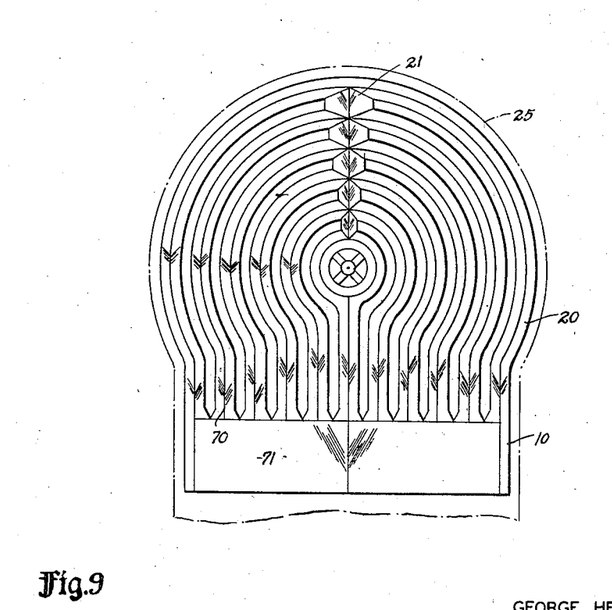

Referring to Fig. 8, this shows a somewhat different type of base for the head 10, the base being flat across the top, as at 65. It will be noted that the tubes 20 merge into each other, the two outermost tubes being connected by header members 66, the next two by header members 67, and the inner two by a somewhat longer header member 68. One advantage of this multiple manifold arrangement is that the header members 66, 67 and 68 can be proportioned, as by trial, in order to divert exactly the required volume of heating media into the tubes 20 in pairs or any desired multiples. Fig. 9 differs from the arrangements of Figs. 2 and 8 principally in that all the tubes 20 have extensions 70 which individually connect with a hollow base 71, and heat from a burner below such base will pass immediately directly into the extensions 70. By this arrangement one can predetermine the degree of heat carried by the indvidual tubes by preselection of burner capacities over areas adjacent to respective portions of the tubes which are found to require greater or less volumes of heating media. In the arrangements shown in Figs. 8 and 9, the entire head opposite the fan has through openings distributed over the entire area adjacent the sphere of operation of the fan.

It will be seen that I have provided a heat-exchange unit which is inexpensive to manufacture and can be made largely as a single casting, and therefore not subject to leakage. The passages provided by the tubes are open above and below for easy clearing of core material in the manufacture. The operating advantage resides principally in the generally circumferentially extending and elongated and unobstructed open spaces past smooth surfaces between the tubes so that air can be swept by the fan in as much of a swirling condition as is incident to the most effective operation of the fan, and so that eddy currents or back pressure such as would tend to reduce the efficiency of the fan or blower, or require a disproportionately powerful fan, are greatly reduced and air noises are eliminated.

The relationship of size or capacity for conduction of heating media on part of the relatively outlying tubes and the manner of presentation of the tube entrances to the combustion chamber so that the relatively outlying tubes more readily receive the heating media than the more inwardly lying tubes constitute a very effective means for preventing the short circuiting of the relatively longer tubes by the relatively shorter tubes such as might occur by reason of greater friction of the wall surfaces of the longer tubes on the heating media flowing therethrough.

After the air has been heated by intimate contact with the walls of the circular conduits or tubes 20, it will be seen that this air is distributed very uniformly by the grill structure shown, the warmed air being delivered in such manner as not to tend to create blasts directly in front of the heater while dissipating warmth generally throughout the area to be heated. The unit operates to supply an unusual amount of heat to the air passed through the head by a relatively small fan or blower, whereas comparable efficiency with other types of heat exchange heads can be secured, if at all, only by great increase in power input, both for heating and for the forcing of air.

The application is a continuation in part of applicant's copending application, Serial No. 256,326, filed February 14, 1939, now abandoned.

I claim:

1. A heat exchange head having a plurality of conduits with portions arranged substantially concentrically and radially spaced apart in radially adjacent relationship to provide a plurality of circumferentially elongated air receiving openings through the head for effective reception of air in a whirling horizontally moving column, and a hollow base adapted to receive products of combustion from a gas burner, said conduits having spaced downward extensions of the concentric portions communicating individually with respective portions of the hollow base.

2. An upright heat exchange head having a plurality of conduits arranged substantially concentrically and radially spaced apart in radially adjacent relationship to provide a plurality of air receiving openings through the head, an upright hollow base connected at its upper end with the conduits and adapted to receive products of combustion from a gas burner and said base being elongated horizontally and transverse to the axis of concentricity.

3. A heating unit having a heat exchange head with walls defining radially spaced generally concentric passages for heating media, the walls defining the respective passages being spaced in a manner to provide circumferentially elongated passages for air, a propeller-type fan at one side of the head, the axis of the fan being approximately concentric with the air passages, and a discharge grill at the opposite side of the head having distributing vanes for air, also concentrically arranged relative to the air passages and having marginal portions in continuous contact with respective walls which define said concentric passages for heating media.

4. In a heat exchange unit, a head having openings therethrough for air, means for forcing air through the openings toward the front of the head, said head having a plurality of flanges on its front side which are disposed generally concentrically about a central region of the head, and air distributing vanes comprising metal strips peripherally in contact with respective flanges and secured at their ends in a manner to maintain such peripheral contact.

5. In a heat exchange head having a plurality of conduits for heating media, means to supply heating media to all the conduits, junction header members for the conduits, said header members being of different sizes proportionate to the volumes of heating media carried by the different conduits, and a damper device comprising a plurality of damper members carried on a common support and adapted to restrict respective junction headers upon predetermined movement of the support.

6. A heating unit comprising a heat exchange head adapted to carry heating media, and means providing arcuately elongated and unobstructed and substantially concentric openings for air leading from one side of the head to the other, said openings contracting and expanding in Venturi effect, means to induce flow of air through said openings in whirling condition about the common axis of the openings, and a grill comprising a series of concentric vane members adjacent the head with spaces between the vanes substantially aligned with the openings, and free vane portions in divergent relation to said common axis.

7. A heat exchange head comprising a one piece metal casting embodying a plurality of tubes for heating media extending generally around a common center and spaced apart to provide substantially concentric air passages through the head, and embodying a hollow downwardly opening combustion chamber directly beneath the tubes and opening at its upper end thereinto, and adapted to receive combustible gaseous fuel from a burner and secondary air, embodying means adapted for discharging residua of the gaseous heating media from the tubes.

8. A heat exchange head having a plurality of tubes arranged substantially concentrically and radially spaced apart and in peripherally adjacent relationship to provide a plurality of circumferentially elongated air receiving openings extending generally horizontally through the head, and a hollow base member open at the bottom in a downward direction and constituting a combined combustion chamber and manifold for the tubes and adapted to receive gaseous fuel from a burner and secondary air and sustain combustion thereof without impingement of flame on the tubes, and distribute the resultant products to the tubes, and means remote from the base member for discharging products of combustion from the tubes.

9. A heat exchange head for gaseous heating media, said head comprising a plurality of substantially concentric tubes for the heating media, said tubes being peripherally adjacent each other and shaped in a manner to provide Venturi passages for air between the tubes, means providing a downwardly open combustion chamber, said tubes being connected respectively at one end of each with said chamber, and conduit means connected to the opposite ends of the tubes remotely of said chamber and adapted to be connected to a stack.

10. In a heating unit, a propeller-type fan, a plurality of tubes for heating media arranged substantially concentrically with the fan axis, peripherally overlapped and of elongated cross section tapered toward the fan in a manner to present thin edges toward the working plane of the fan blades, the space between the fan and tubes being unobstructed so that the fan delivers air to the tubes in a whirling column, said edges of the different tubes being in staggered relationship such that the edges of the tubes lying near the center are farther away from the working plane of the fan blades than are the edges of the tubes lying remotely of the center.

11. A heating unit having a propeller-type fan, an upright heat exchange head generally parallel to the working plane of the fan and in front of the fan having a series of radially spaced conduits for heating media extending in a circumferential direction relative to the fan axis and presenting a series of circumferentially elongated and unobstructed openings toward the fan which converge in a direction away from the fan, and then diverge in said direction in a manner to form Venturi passages for air delivered by the fan, downwardly open inlet manifold means connected to the conduits and adapted for admitting and distributing gaseous heating media to the conduits, an exhaust passage means connected to the conduits, and means to block the flow of said media directly from the inlet means to the exhaust passage means.

12. A heat exchange head comprising a series of peripherally adjacent tubes defining arcuately elongated and substantially concentric openings for air leading from one side of the head to the other, means to induce flow of air through said openings, and a grill comprising a series of concentric vane members adjacent the head with the spaces between the vanes substantially aligned with the openings.

13. A heat exchange unit comprising an upright head having a plurality of elongated conduits for heating media extending in radially adjacent relationship to each other about a common center and spaced apart radially of the center to provide substantially parallel arcuate air passages through the head, air forcing means coaxial with said center and constructed and arranged to deliver air between the conduits in whirling condition about said center, said head having a combustion chamber and means to distribute such media from the chamber to the conduits by convection, and means arranged for discharging residua of the heating media from the conduits, said parallel passages for air being circumferentially elongated and unobstructed from the distribution means to the discharging means, and means to prevent passage of heating media directly from the distribution means to the discharging means in a manner to by-pass the conduits.

14. A heat exchange head adapted to operate in upright position, the head having a downwardly open box-like manifold adapted to overlie and receive products of combustion rising from a burner below the manifold and a plurality of conduits for heating media all having end portions spaced apart by and communicating directly with the inlet manifold so that each of the conduits receives a portion of the media from the manifold, said conduits extending from the manifold so as to carry the heating media upwardly in a plurality of paths clockwise and in a plurality of paths counter-clockwise around a common center, said conduits being spaced apart radially of the center and adjacent conduits being so shaped as to provide substantially concentric circumferentially elongated and unobstructed air passages through the head, and means arranged for discharging residua of the heating media from portions of the conduits which are remote from the manifold.

15. A heat exchange head having a plurality of conduits of different length arranged substantially concentrically and in upright, radially adjacent, spaced relationship to provide a plurality of concentric circumferentially elongated and unobstructed air receiving openings extending generally horizontally through the head and thereby adapted for unobstructed reception of air delivered to the head horizontally in whirling condition about the axis of concentricity, and a hollow base member below the head constituting a combustion chamber open downwardly and thereby adapted to receive products of combustion from a burner and having distributing portion disposed directly between end portions of the conduits and communicating therewith, which distributing portion gradually diminishes in cross section upwardly, a portion of relatively greater cross section communicating with longer conduits, and a portion of smaller cross section with shorter conduits.

16. A heat exchange head having substantially concentric conduits for heating media, said conduits being approximately of diamond shape cross section and peripherally adjacent each other and providing spaced in a manner circumferentially elongated and unobstructed Venturi passages for air between the conduits, and a manifold connected to the conduits in a manner to enable supplying of gaseous heating media to the conduits, said manifold being interposed directly between end portions of the conduits which lie on opposite sides of the manifold and being of diminishing cross section, smaller section portions intercepting end portions of conduits near the center and the smallest section portion terminating at the innermost conduit in communication exclusively therewith at end portions thereof, and larger section portions intercepting end portions of conduits farther from the center, and a combustion chamber opening into the bottom of the manifold and adapted to receive fuel from a burner and secondary air.

17. A heater comprising heat exchange head, air forcing means operable to deliver air thereto in whirling condition about a central axis of the head, said head comprising a metal member embodying a plurality of conduits for such gaseous media and extending generally around said central axis, said conduits being radially adjacent each other and spaced apart, and with the adjacent exterior surfaces so related to each other as to provide a plurality of substantially concentric, circumferentially elongated and unobstructed air passages through the head, a hollow manifold to admit gaseous media to the conduits, and means to discharge residua of the heating media from the conduits, the metal member being so constructed and arranged that all portions of the media passing from the manifold to the discharging means are constrained to pass through respective conduits, and means providing a combustion chamber below the manifold and communicating with the manifold and conduits, and a burner in the combustion chamber for supplying gaseous heating media thereinto and arranged so that the gaseous media may flow by convection upwardly through the burner from the head.

18. A heat exchange head having tubes for heating media which extend approximately concentrically and peripherally adjacent each other around a common center axis in a manner to provide circumferentially elongated passages for air therebetween generally parallel to said center axis, means to supply gaseous heating media to the tubes, and means to convey spent heating media from the tubes, the tubes which lie outwardly from the center being increased in extent parallel to said center axis in a manner to increase the transverse area of the outwardly lying tubes over the transverse area of relatively inwardly lying tubes.

19. A heat exchange head comprising an upright hollow base member having a combustion chamber which is downwardly open and thereby adapted to receive fuel and secondary air at its lower portion and to sustain combustion thereof within the chamber and discharge the products of combustion upwardly from the chamber by convection, arcuate tubes connected at their lower ends to the upper portion of the combustion chamber for receiving products therefrom and extending upwardly and outwardly therefrom in concentric relation to a common horizontal axis which extends forwardly and rearwardly with respect to and is disposed above the base member, discharge conduit means connected to the tubes at their upper ends, said tubes being spaced apart radially and being peripherally adjacent and defining between adjacent tubes a plurality of circumferentially elongated air passages which extend unobstructed from the discharge conduit means to the base member.

20. In a heater, an upright heat exchange head comprising a plurality of tubes arranged generally concentrically about a horizontal axis and peripherally adjacent and spaced apart in a single upright series at each side of an upright plane extending from rear to front and centrally of the head so that air can be passed from rear to front of the head through the spaces between the tubes, a hollow base constituting an inlet manifold and combustion chamber, the interior of the base communicating with all the tubes at their lower ends in a manner to enable distribution of products of combustion to the tubes by convection, means remote from the base adapted and arranged to convey spent products of combustion from the head, and a burner arranged to discharge combustible gaseous media upwardly in said chamber.

21. In a heater, an upright heat exchange head comprising a series of generally concentric tubes peripherally adjacent and spaced apart so that the principal planes of the tubes are parallel, means adapted to distribute heating media to the tubes, means adapted to conduct residua of the heating media from the tubes, the exterior surfaces of adjacent tubes being so configured relative to each other as to provide Venturi-shaped air passages between adjacent tubes, which passages are elongated and unobstructed circumferentially of the head between the aforesaid two means, and burner means arranged to discharge combustible gaseous media into the first means at a location below the level of the tubes.

22. A heat exchange head having a generally upright series of generally concentric tubes on each side of a central upright plane extending from front to rear of the head, hollow means forming a combustion chamber extending on both sides of said plane, open at the bottom and closed at the sides, front and rear and communicating with all the tubes above the open bottom, said tubes being peripherally adjacent and spaced apart so that air can be forced through the head between the tubes from rear to front, and means connected with the tubes for conveying spent products of combustion from the tubes, the inner transverse area of the outwardly lying tubes being increased over the inner transverse area of the inwardly lying tubes.

23. A heat exchange head having a series of relatively long and short tubes on each side of a central upright plane which bisects the head when the head is in an upright position, a hollow distribution manifold for gaseous heating media extending on both sides of said plane and constructed and arranged to convey heating media toward the tubes in approximately parallel paths, means connected with the tubes remotely of the manifold for conveying residua of the heating media from the tubes, said tubes being spaced apart transversely of said plane in mutually adjacent relationship so that air can be forced through the head in heat exchange relation to the tubes between the tubes in a direction parallel to said plane, the longitudinal axes of the entrance portions of relatively longer tubes being more nearly vertical than are the axes of the entrance portions of relatively shorter tubes in said position of the head, whereby the longer tubes tend to receive greater volumes of gaseous heating media.

24. An upright heat exchange head comprising means forming a combustion chamber adapted to receive fuel and secondary air at its lower portion and to sustain combustion thereof within the chamber and discharge the products of combustion upwardly from the chamber by convection, mutually adjacent tubes in common or parallel planes and spaced apart in said planes to receive air between them from front to rear of the head, said tubes being connected at their lower ends to the combustion chamber for receiving products therefrom, discharge conduit means connected to the tubes remotely of the chamber, some of the tubes being longer than others, and the entrances of longer tubes having their longitudinal axes disposed more nearly vertical than the longitudinal axes of the entrance portions of shorter tubes.

25. The combination of a heat exchange head having a series of peripherally adjacent and radially spaced arcuate tubes, and having means to supply the tubes with heating media and means to discharge residua thereof from the tubes, a grill forwardly of the head and having a series of outwardly divergent annular vanes arranged concentrically with the tubes, means to force air from rear to front between the tubes and thence to between the vanes, and means blocking the central portion of the grill against rearward movement of air from regions forwardly of the grill into contact with the head.

GEORGE HERBSTER.